United States Patent
Gray et al.

(10) Patent No.: US 9,411,071 B2
(45) Date of Patent: Aug. 9, 2016

(54) METHOD OF ESTIMATING ROCK MECHANICAL PROPERTIES

(71) Applicants: Gary G. Gray, Bellaire, TX (US); Brian R. Crawford, Missouri City, TX (US); Pablo F. Sanz Rehermann, Houston, TX (US); Jessica Lundin, Overland Park, KS (US)

(72) Inventors: Gary G. Gray, Bellaire, TX (US); Brian R. Crawford, Missouri City, TX (US); Pablo F. Sanz Rehermann, Houston, TX (US); Jessica Lundin, Overland Park, KS (US)

(73) Assignee: ExxonMobil Upstream Research Company, Houston, TX (US)

( * ) Notice: Subject to any disclaimer, the term of this patent is extended or adjusted under 35 U.S.C. 154(b) by 376 days.

(21) Appl. No.: 13/967,125

(22) Filed: Aug. 14, 2013

(65) Prior Publication Data
US 2014/0067351 A1    Mar. 6, 2014

Related U.S. Application Data

(60) Provisional application No. 61/695,774, filed on Aug. 31, 2012.

(51) Int. Cl.
| | | |
|---|---|---|
| *G06G 7/48* | (2006.01) | |
| *G06G 7/50* | (2006.01) | |
| *G01V 99/00* | (2009.01) | |

(52) U.S. Cl.
CPC .................... *G01V 99/005* (2013.01)

(58) Field of Classification Search
CPC .................................. G01V 99/005
USPC .................................. 703/6, 9, 10
See application file for complete search history.

(56) References Cited

U.S. PATENT DOCUMENTS

| | | |
|---|---|---|
| 4,817,062 A | 3/1989 | De Buyl et al. |
| 5,398,215 A | 3/1995 | Sinha et al. |
| 5,416,697 A | 5/1995 | Goodman |
| 5,442,950 A | 8/1995 | Unalmiser et al. |
| 5,475,650 A | 12/1995 | Sinha et al. |
| 5,485,431 A | 1/1996 | Johnson et al. |
| 5,521,882 A | 5/1996 | D'Angelo et al. |
| 5,544,127 A | 8/1996 | Winkler |

(Continued)

FOREIGN PATENT DOCUMENTS

| | | |
|---|---|---|
| WO | WO2004/106699 | 12/2004 |
| WO | WO2008/028075 | 3/2008 |

(Continued)

OTHER PUBLICATIONS

Jesse Havens (Mechanical properties of the Bakken Formation, Thesis, 2012, (124 pages)).*

(Continued)

*Primary Examiner* — Kamini S Shah
*Assistant Examiner* — Andre Pierre Louis
(74) *Attorney, Agent, or Firm* — ExxonMobil Upstream Research Company, Law Department

(57) ABSTRACT

A method of estimating at least one mechanical property value of a rock formation in the geologic past. In one embodiment, a correlation model is generated which correlates at least one mechanical property with a porosity value and a composition value relative to a first rock type. An estimation of a past porosity value and a past composition value is then generated for the rock formation at a point of time in the past. A mechanical property value at the point of time in the past is identified in the correlation model based on the estimated past porosity and past composition values.

11 Claims, 7 Drawing Sheets

(56) References Cited

U.S. PATENT DOCUMENTS

| | | | |
|---|---|---|---|
| 5,619,475 | A | 4/1997 | Winkler |
| 5,741,971 | A | 4/1998 | Lacy |
| 5,767,399 | A | 6/1998 | Smith et al. |
| 5,794,720 | A | 8/1998 | Smith et al. |
| 6,098,021 | A | 8/2000 | Tang et al. |
| 6,109,368 | A | 8/2000 | Goldman et al. |
| 6,131,673 | A | 10/2000 | Goldman et al. |
| 6,302,221 | B1 | 10/2001 | Hamman et al. |
| 6,374,926 | B1 | 4/2002 | Goldman et al. |
| 6,386,297 | B1 | 5/2002 | Cooley et al. |
| 6,408,953 | B1 | 6/2002 | Goldman et al. |
| 6,612,382 | B2 | 9/2003 | King |
| 6,654,692 | B1 | 11/2003 | Neff |
| 6,718,265 | B2 | 4/2004 | Herron et al. |
| 6,941,231 | B2 | 9/2005 | Zeroug et al. |
| 7,032,689 | B2 | 4/2006 | Goldman et al. |
| 7,035,778 | B2 | 4/2006 | Goldman et al. |
| 7,066,019 | B1 | 6/2006 | Papanastasiou |
| 7,085,696 | B2 | 8/2006 | King |
| 7,181,380 | B2 | 2/2007 | Dusterhoft et al. |
| 7,261,167 | B2 | 8/2007 | Goldman et al. |
| 7,317,991 | B2 | 1/2008 | Wang et al. |
| 7,357,196 | B2 | 4/2008 | Goldman et al. |
| 7,373,251 | B2 | 5/2008 | Hamman et al. |
| 7,404,456 | B2 | 7/2008 | Weaver et al. |
| 7,412,331 | B2 | 8/2008 | Calhoun et al. |
| 7,472,022 | B2 | 12/2008 | Birchwood |
| 7,526,385 | B2 | 4/2009 | Sayers |
| 7,539,625 | B2 | 5/2009 | Klumpen et al. |
| 7,546,884 | B2 | 6/2009 | Veeningen et al. |
| 7,548,873 | B2 | 6/2009 | Veeningen et al. |
| 7,555,414 | B2 | 6/2009 | Calhoun et al. |
| 7,649,804 | B2 | 1/2010 | Sinhn |
| 7,650,241 | B2 | 1/2010 | Jogi et al. |
| 7,657,375 | B2 | 2/2010 | Wang et al. |
| 7,664,602 | B2 | 2/2010 | Leurer et al. |
| 7,676,353 | B2 | 3/2010 | Bradford et al. |
| 7,859,943 | B2 | 12/2010 | Herwanger |
| 8,154,950 | B2 | 4/2012 | Heliot et al. |
| 2002/0112540 | A1 | 8/2002 | Zeroug et al. |
| 2004/0237640 | A1 | 12/2004 | Meister et al. |
| 2007/0203677 | A1 | 8/2007 | Awwiller |
| 2007/0294034 | A1 | 12/2007 | Bratton et al. |
| 2008/0249714 | A1 | 10/2008 | Calhoun et al. |
| 2008/0319675 | A1* | 12/2008 | Sayers ............ G01V 1/50 702/11 |
| 2008/0319726 | A1 | 12/2008 | Berge et al. |
| 2009/0006058 | A1 | 1/2009 | King |
| 2009/0020883 | A1 | 1/2009 | Nomura et al. |
| 2009/0132218 | A1 | 5/2009 | Ledgerwood, III |
| 2009/0187391 | A1 | 7/2009 | Wendt et al. |
| 2009/0254283 | A1 | 10/2009 | Jacobi et al. |
| 2009/0260415 | A1 | 10/2009 | Suarez-Rivera et al. |
| 2010/0223039 | A1 | 9/2010 | Maliassov |
| 2011/0015907 | A1* | 1/2011 | Crawford ............ G01V 99/00 703/2 |
| 2011/0166843 | A1* | 7/2011 | Hsu ............ G01V 11/00 703/10 |
| 2013/0138409 | A1 | 5/2013 | Lee et al. |

FOREIGN PATENT DOCUMENTS

| | | |
|---|---|---|
| WO | WO2008/131351 | 10/2008 |
| WO | WO2011/070453 | 6/2011 |

OTHER PUBLICATIONS

Wafa et al. (Estimation of the rock mechanical properties using conventional log data in North Rumaila field, 2012 (7 pages)).*

Chang et al. (Empirical relations between rock strength and physical properties in sedimentary rocks, 2005 (15 pages)).*

Mondol, N. H., et al. (2007), "Experimental mechanical compaction of clay mineral aggregates—Changes in physical properties of mudstones during burial," *Marine and Petroleum Geology*, vol. 24, pp. 289-311.

Day-Stirrat, R. J., et al. (2010), "Open-system chemical behavior in deep Wilcox Group mudstones," Texas Gulf Coast, USA, *Marine and Petroleum Geochemistry*, vol. 24, pp. 1804-1818.

Bemer, E., et al., (2004) "Geomechanical Log Deduced from Porosity and Mineralogical Content," *Oil & Gas Science and Technology—Rev. IFP Energies nouvelles*, vol. 59, No. 4, pp. 405-426.

Nur et al., (1998), "Critical porosity: a key to relating physical properties to porosity in rocks," *The Leading Edge* 17, 357-362.

* cited by examiner

METHOD OF ESTIMATING ROCK MECHANICAL PROPERTIES

CROSS-REFERENCE TO RELATED APPLICATION

This application claims the benefit of U.S. Provisional Patent Application 61/695,774, filed Aug. 31, 2012, entitled METHOD OF ESTIMATING ROCK MECHANICAL PROPERTIES, the entirety of which is incorporated by reference herein.

FIELD OF THE INVENTION

The present invention generally relates to the field of petroleum geology and, more specifically, to a system and method for estimating mechanical properties of a subsurface rock formation backward through time.

BACKGROUND

This section is intended to introduce various aspects of the art, which may be associated with some embodiments of the present invention. This discussion is believed to assist in providing a framework to facilitate a better understanding of particular aspects of the present invention. Accordingly, it should be understood that this section should be read in this light, and not necessarily as admissions of prior art.

The prediction or estimation of the mechanical behaviors of a rock formation is of great importance to the petroleum industry. Such estimations allow, for example, for the strength of the rock formation to be modeled and the failures within the rock layers of a hydrocarbon system to be predicted. Rock failures can take a variety of forms, such as compaction (analogous to compressing a sponge), brittle fracture (i.e., creation of faults), or ductile behavior (i.e., flowage such as salt flows, or distributed deformation). A basic understanding of a typical hydrocarbon system aids in the appreciation of such failures.

Referring now to the simplified diagram shown in FIG. 1, a typical hydrocarbon system 100 includes a variety of basic components. The most basic component is a source rock 102. All known source rock types are sedimentary; that is, they are formed by the deposit of sediment over millions of years. Various portions of the source rock 102 may be permeable based on their porosity. Like pores in a sponge, rock pores are typically filled with air, water, and/or organic materials 104. The organic material 104 typically comprises the remains of dead plants, animals, and micro-organisms that are trapped as the layers of sediment build up.

As more layers of sediment are piled on, the temperature and pressure of the source rock 102 rises. If the temperature and pressure reach appropriate levels, often referred to as thermal windows, the organic material 104 within the source rock 102 is transformed into hydrocarbons 106, such as, but not limited to, natural petroleum and natural gas.

In the depicted example, adjacent to the source rock 102 is a porous, permeable layer of rock called reservoir rock 108. At least some of the hydrocarbons 106 generated from the source rock 102 have a lower density than the water in the pores of the source rock 102. As a result, the hydrocarbons 106 tend to migrate, or float, upward from the source rock 102 and into the porous reservoir rock 108.

As further depicted in FIG. 1, a layer of impermeable rock is located above the reservoir rock 108. This impermeable rock is commonly referred to as seal rock 110. In order for hydrocarbons 106 to accumulate in the subsurface, a hydrocarbon trap 114 is required. The hydrocarbon trap 114 can take a variety of forms, such as, but not limited to, an arch or a pinch-out (i.e., taper) of the reservoir rock 108. The seal rock 110 and the trap 114 hold the hydrocarbons 106 in the reservoir rock 108 and inhibit the hydrocarbons 106 from migrating further towards the earth's surface 112.

As noted above, the various layers of rock within the hydrocarbon system 100 are susceptible to failure. However, some rock failures can be thought of as "good fractures" while other are thought of as "bad fractures". When drilling a hydrocarbon production well, it is desirable to drill the well bore in such a way as to take advantage of existing fractures or potential fractures to enhance the permeability of the reservoir and increase the flow of hydrocarbons through the reservoir to the well. Such fractures are considered "good fractures."

Conversely, if a fracture were to occur in the seal rock 110 creating trap 114, then the hydrocarbons 106 could be released from the trap 114 and allowed to migrate to the surface 112. This would be an example of a "bad fracture". In another example, if the source rock 102 was relatively impermeable and a fracture happened to establish a fluid connection between the reservoir rock 108 and an aquifer 116, then water would migrate from the aquifer 116 into the pores of the reservoir rock 108. The migrated water could plug the pores of the reservoir rock 108 and make it difficult, if not to impossible, for the hydrocarbons 106 to flow through its pore structure up to the well head.

The current state of the art in geology allows prediction of certain rock constitutive behaviors such as failure, and thus prediction of fracture, by using estimates of (i) the various stresses existing at different depths and locations in the formation and (ii) the strength of the rock, which generally increases with depth. Estimates of the first-mentioned values, namely stress patterns in a rock formation, are typically a function of three variables: the weight of the overburden above the formation, the degree of "push" or "pull" that the formation experiences due to tectonic forces, and the mechanical properties of the formation and adjacent rock units.

One constraint to such a method of failure and fracture prediction is that it is not possible today to directly measure the values of the mechanical properties of the rock as they existed millions of years ago, as the rock was being transformed by compaction and other diagenetic processes. To address this constraint, present-day conditions of the rock are measured and by "working backwards" from that information, inferences can be drawn about the likely properties of the rock in the past.

A variety of generalized strategies for modeling ancient rock properties have been used to provide information for a fracture-prediction analysis. One approach makes use of a linear interpolation between (i) rock properties assumed to exist at the time of the rock's deposition or soon thereafter and (ii) properties measured or assumed at the present day. The interpolation is accomplished at the proportional geologic time interval that is being modeled.

Another approach is to assume that all rock properties, such as cohesion, internal angle of friction, consolidation pressure, etc., are a function of burial depth and compaction alone. In this approach, the estimation can be as simple as deriving a compaction history by numerically "stacking" layer upon layer and allowing gravity and the weight of the overlying layers to compress and densify the layer or layers of interest. This can also be calculated using a density profile with depth and computing the mean stress with which approximates the consolidation pressure.

Another approach is to measure present-day properties of the rocks of interest and to either use those values explicitly or modify those values for some time in the past. This technique could be described as an educated guesswork. Wholly ad hoc guesses have also been used.

None of these techniques provide a systematic and scientific way to estimate rock properties at some time in the past. Thus, there is a need for improvement in this field.

SUMMARY

The present disclosure provides a system and method for mechanical property prediction of a subsurface rock formation.

One embodiment of the present disclosure is a method of estimating a mechanical property value of a rock formation comprising: generating a correlation model correlating at least one mechanical property with a porosity value and a composition value relative to a first rock type; generating an estimation of a past porosity value and a past composition value for the rock formation at a point of time in the past; and identifying in the correlation model a mechanical property value at the point of time in the past based on the estimated past porosity and past composition values.

The foregoing has broadly outlined the features of one embodiment of the present disclosure in order that the detailed description that follows may be better understood. Additional features and embodiments will also be described herein.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The present invention and its advantages will be better understood by referring to the following detailed description and the attached drawings in which.

Figure 1:
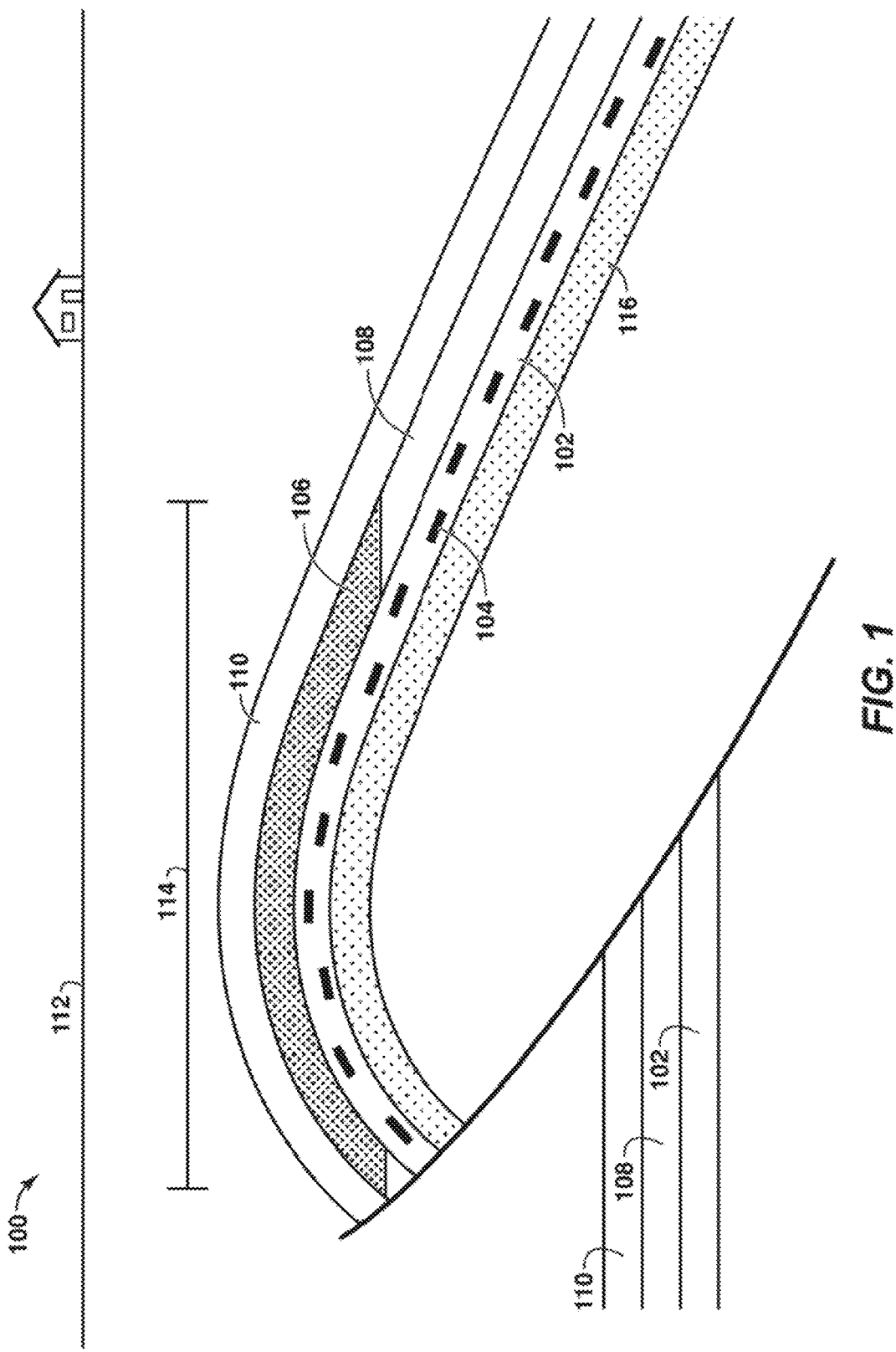
FIG. 1 is a cross-sectional view of a typical hydrocarbon system.

It should be noted that the figures are merely examples of several embodiments of the present invention and no limitations on the scope of the present invention are intended thereby. Further, the figures are generally not drawn to scale, but are drafted for purposes of convenience and clarity in illustrating various aspects of certain embodiments of the invention.

DESCRIPTION DESCRIPTION

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Persons skilled in the technical field will readily recognize that in practical applications of the disclosed methodology, it must be performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "generating", "identifying", "processing", "computing", "calculating", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The following statements are provided to aid the reader in understanding the present disclosure. While these statements are not a complete definition of term as understood to someone skilled in the relevant art(s), in general, the terms provided below have the following meanings in the context of the present disclosure.

Cement refers to fine-grained minerals (i.e., calcite, quartz, or clay) that bind together the more-coarse-grained matrix (i.e., sand or silt) of sedimentary rocks.

Chemical rock refers to rock formed by precipitation of minerals, such as from seawater. One common form of chemical rock is limestone.

Clastic rock refers to rock created from clasts. Clasts are fragments or grains that have been broken or eroded from pre-existing rock.

Compaction refers to the packing of later-deposited sediment grains into pores within an earlier-deposited layer under the weight of still-later-deposited sediment.

Composition: In the context of clastic rock, composition refers to the relative proportions of sand- to clay-sized particles. For chemical rocks, composition refers generally to the relative proportions of various precipitated minerals, such as, calcite, dolomite, ankerite, barite, etc. Composition can be determined through a variety of known techniques, such as, but not limited to, X-ray diffraction analysis of a whole-rock powder or petrographic point counting.

Diagenesis refers to physical, chemical, and/or biological changes to a given layer of sediment that occur over time as the layer is buried by the deposit of successive additional layers. Such changes may result from (i) compaction of the sediment, (ii) partial or complete dissolution of some minerals and/or organic materials in the given layer, resulting from compaction-generated increases in their solubility, and/or (iii) precipitation of new minerals into spaces left by such dissolution. The diagenesis process can be affected by heat generated by radioactive decay of elements that may be present in sediment, such as uranium, cesium, and the like.

Kerogen refers to certain organic materials found in sedimentary rock that are converted to hydrocarbons (e.g., oil and/or natural gas) when the rock's temperature reaches and remains at the required temperature for the required amount of time. See also Thermal maturity.

Lopatin-style modeling may involve, among things, (i) measuring the depth of different rock layers in a well bore and (ii) determining the ages of the various layers of rock. The age determination may be accomplished by various techniques, such as, but not limited to, radiometric dating (i.e., carbon dating) and/or through comparisons of fossils found in the rock layers in what amounts to a forensic study of the rock layers penetrated by the well bore. Such modeling is commonly implemented via software, such as the TOUCHSTONE™ software commercially available from Geocosm, LLC in Austin, Tex., or the TEMIS software commercially available from the Institut Français du Petrole (IFP) in Rueil-Malmaison Cedex, France.

Mechanical properties of a rock that are of interest could include: Poisson's ratio, Young's modulus, angle of internal friction, and cohesion. However, other mechanical properties may be of interest for other applications.

Point counting generally involves mounting a slice of rock to a microscope slide and then polishing it down to a thickness of 30 microns. A microscope is used to count rock grains, pores, and/or other items of interest, in an area of the slice divided into a grid. The point count may be performed either by eye or by computer-controlled scanning.

Porosity generally refers to the extent to which rock is composed of spaces or voids. These spaces are commonly filled with air or water until other materials are packed into the spaces. Porosity is defined as the ratio of the volume of voids within a rock to the total volume of the rock. It can be determined through a variety of standard techniques, both laboratory and petrographically based.

Sedimentary rock may be formed by the accumulation of mineral and/or organic particles, typically carried by moving fluids such as wind or water flows. Sedimentary rock may also be formed by the precipitation of minerals from a solution. Sedimentary rock is often categorized as clastic rock or as chemical rock.

Thermal history, also known as temperature history, is typically obtained by analyzing two types of data. The first data type is the present-day temperature profile as measured for the various layers comprising a rock formation. Second is an analysis of the thermal maturity indicators for the various layers.

Thermal maturity refers to the extent to which kerogen in a rock has been converted into hydrocarbons by chemical or physical processes. Thermal maturity depends in part on the maximum temperature the rock has reached over time, and in part on the length of time elapsed at that temperature. Thermal maturity is sometimes assessed by measuring the light reflectance of a type of organic matter, known as vitrinite—akin to small lumps of coal—which increases with the maximum temperature reached and length of time at that temperature. Thermal maturity can also be assessed through a variety of other techniques, such as, but not limited to, measuring biomarker transformations, fluid inclusions, the color of spores and pollen, etc.

Figure 2:
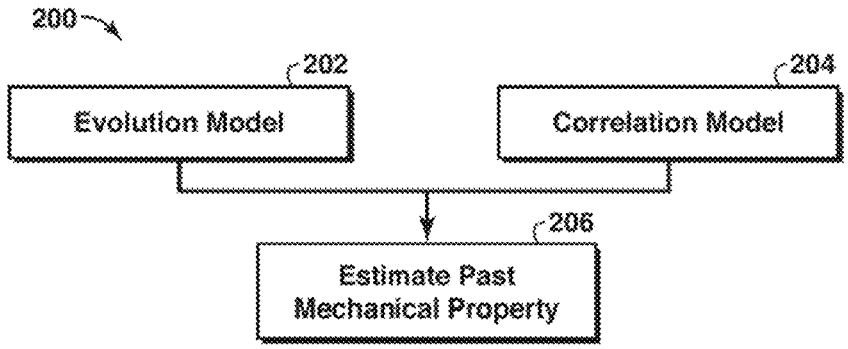
FIG. 2 is a workflow diagram illustrating the basic components of one embodiment of the present disclosure.

The disclosed methodology is a process to produce an estimate of one or more rock properties of interest at one or more times of interest. FIG. 2 illustrates one embodiment of the current disclosure in a broad sense with many of the general steps being described in more detail with respect to FIG. 3. Looking at FIG. 2, process 200 relies on an estimate of rock porosity and composition through time, referred to herein as evolution model 202. The evolution model 202 is generated with respect to the particular rock formation(s) of interest. A variety of known techniques can be used to generate the evolution model 202, such as, but not limited to, Lopatin-style modeling.

Many known techniques combine an understanding of the age, thickness, and composition of rock layers deposited in a basin with estimates of the thermal stress experienced by the basin in order to estimate the timing and degree of compaction and cementation by minerals precipitated in the pore space, as well as the conversion of some mineral types to other mineral types. The evolution models may then be calibrated with present-day property of the rock(s) in order to make then more accurate. The present-day property data may include, but is not limited to, amount and types of cementation, thermal maturity indicators, and amounts and kinds of alteration products. The evolution model 202 provides a quantitative way to estimate how one or more of these rock properties have evolved over the lifetime of the sedimentary layers of interest.

The depicted process 200 also utilizes a correlation model 204. In one embodiment, the correlation model 204 is derived from a set of empirical calibrations that relate measured rock compositions, porosities, and mechanical properties for a particular rock type. In some embodiments, a plurality of correlation models is used. As will be appreciated by those of ordinary skill, rock porosity can be measured through any variety of known techniques, both laboratory and petrographically based.

Information from the evolution model 202 is then applied to the correlation model 204 to produce an estimate 206 of one or more rock mechanical properties of interest at one or more particular times of interest. In one embodiment, past rock composition and porosity data from the evolution model is applied to the correlation model. In some embodiments, the algorithms utilized by the correlation model 204 are directly applied to the evolution model 206 to generate, identify or estimate a historic mechanical property data set or volume. In other embodiments, porosity and composition values are determined for specific points of time in the past, thereby allowing mechanical properties to be calculated at each corresponding past time.

Figure 3:
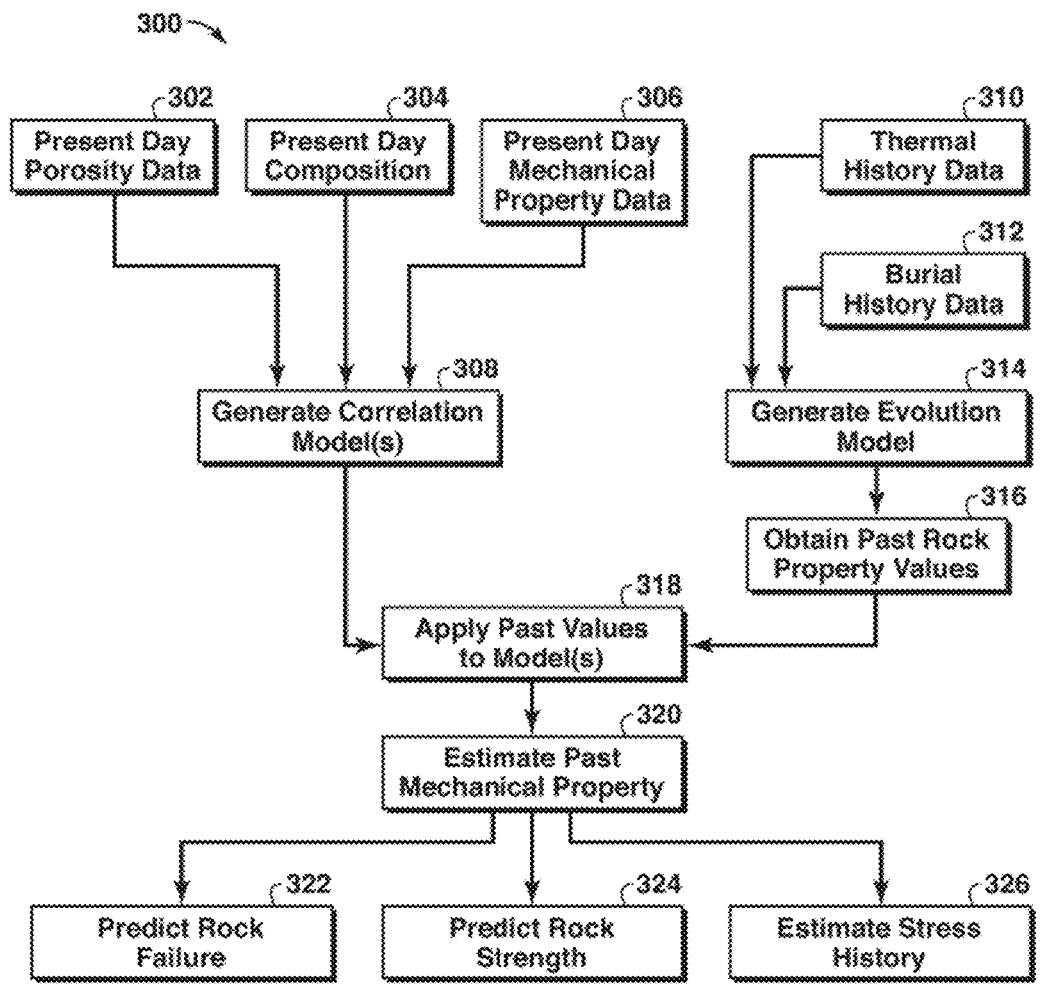
FIG. 3 is a workflow diagram of one embodiment of the present disclosure.

Another embodiment of the present disclosure is provided in FIG. 3. As will become apparent, process 300 produces at least one estimate of at least one historical mechanical property of a rock. As but one example, the rock may be a sedimentary rock, such as the reservoir rock 108 depicted in FIG. 1.

Process 300 begins by providing present day porosity data 302, present day composition data 304 and present day mechanical property data 306. Composition data 304 may comprise, but is not limited to, the amount of clay or clay-sized matrix in the rock. Data 302, 304, 306 may to pertain to sandstones, wackes, shales, or carbonates to name a few non-limiting examples.

As appreciated by those skilled in the art, data 302, 304, 306 may be obtained through a variety of known techniques and may be comprised of a single data set or separate data sets. In some embodiments, porosity data 302 may be obtained by applying standard thin-section point-counting techniques or helium porosimetry techniques to a given rock sample. In some embodiments, composition data 304 may be obtained by applying standard thin-section point-count techniques or quantitative measurement of the composition via x-ray diffraction techniques to a rock sample. It will be further appreciated by those of ordinary skill having the benefit of this disclosure that it may be efficient to simultaneously collect porosity data 302 and composition data 304 using a point-counting technique. In some embodiments, mechanical property data 306 may be measured directly using conventional techniques or ascertained from previously-stored data.

At step 308, the present day porosity data 302, the present day composition data 304, and the present day mechanical property data 306 are processed to produce a mechanical property correlation model. In one embodiment, the correlation model relates rock porosity and composition information with at least one mechanical property. In some embodiments, a correlation model can be produced for a variety of rock types, such as, but not limited to, sandstones, wackes, shales, or carbonates. A database of correlation models may also be provided. In such an embodiment, the correlation model database may comprise a wide spectrum of sedimentary lithologies most often encountered within a hydrocarbon reservoir environment.

In one embodiment, a correlation model consists of sets of related data points. In another embodiment, a correlation model consists of one or more equations describing one or more relationships between data points. While the depicted embodiment utilizes porosity, composition and mechanical property data, other embodiments may utilize fewer data types, additional forms of data, and/or different forms of data to produce the correlation model.

One approach to generating the mechanical property correlation model (step 308) is described in U.S. Patent Application Publication No. 2011/0015907 to Crawford et al. (hereafter the "'907 Publication"), which is incorporated by reference in its entirety. The techniques described in the '907 Publication are well suited for modeling sandstone rocks. For shale rocks, the correlation model may be derived using conventional techniques, such as those described by Nazmul H. Mondol, Knut Bjørlykke, Jens Jahren, and Kaare Høeg in "Experimental mechanical compaction of clay mineral aggregates—Changes in physical properties of mudstones during burial," MARINE AND PETROLEUM GEOLOGY, v. 24, pp. 289-311, May 2007; and by Ruarri J. Day-Stirrat, Kitty L. Milliken, Shirley P. Dutton, Robert G. Loucks, Stephen Hillier, Andrew C. Aplin and Anja M. Schleicher in "Open-system chemical behavior in deep Wilcox Group mudstones, Texas Gulf Coast, USA," MARINE AND PETROLEUM GEOCHEMISTRY, vol. 24, pp. 1804-1818, October 2010.

Carbonate rocks present different challenges for deriving a correlation model. Correlation of present-day porosity and composition to the mechanical properties of the rock can be done in accordance with known techniques. See, e.g., Elisabeth Bemer, O. Vincké and P. Longuemare, "Geomechanical Log Deduced from Porosity and Mineralogical Content," in Oil & Gas Science and Technology—Rev. IFP Energies nouvelles, vol. 59, no. 4, pp. 405-426, July-August 2004.

As depicted, process 300 also includes providing thermal history data 310 and burial history data 312 for a given rock sample. Thermal history data 310 and burial history data 312 may be obtained using known historical modeling techniques, such as Lopatin style modeling and/or a time-temperature index (TTI) of thermal maturity. The thermal history data 310 and the burial history data 312 are then processed to generate an evolution model 314. In some embodiments, additional data may also be used to generate the evolution model. The evolution model provides a quantitative way to estimate how one or more of rock properties have evolved over the lifetime of a sedimentary layer of interest. As a result, estimates of past rock properties can be obtained (step 316) from the evolution model.

In one embodiment, a past porosity value of the rock of interest is obtained. In other embodiments, other rock property values are identified, such as, but not limited to, rock cementation or mineralogical composition values. Cementation refers to the amounts and types of cements present in a rock. Those of ordinary skill in the art will understand that for a given type of cement, an estimate of the amount and type of cement could be zero. In some embodiments, estimates of past rock properties are produced at a fixed time interval (i.e., every million years). In other embodiments, estimates of past rock properties are obtained only for a particular time, or times, of interest. For clastic rocks, the clay content of the rock (i.e., the amount of fine-grained matrix) is of particular interest in the composition modeling.

After the past rock property values are obtained, selected or identified, they are then applied to the correlation model(s) 318. In one embodiment of the disclosed methodology, past porosity and composition values identified via the evolution model are applied to the correlation model. These past values are then used to estimate a past mechanical property 320. In one embodiment, the past porosity and composition values are applied to a single correlation model for all past times. In another embodiment, past porosity and composition values corresponding to different times are applied to different correlation models. By shifting between different correlation models, one embodiment of the disclosed methodology can adjust for varying conditions (i.e., rock types) experienced during a rock's formation.

The estimated mechanical property information 320 may then be utilized in a variety of applications. Fracture sets can be formed from a variety of conditions, such as, but not limited to, weakening caused by increases in porosity or increases in clay caused by diagenesis. Therefore, in some embodiments, the disclosed methodology may be applied to a data set in order to reveal or predict non-tectonic ways in which regional fracture sets may have been formed (step 322). These past mechanical property estimates may also be used to model and predict rock formation strength (step 324).

The past mechanical property information may be further used to produce an estimate of the earth's stress conditions at a horizon of interest at the time of interest (step 326). The stress information may then be used, for example, to model the mechanical evolution of a geological structure. The historical rock mechanical property information is also helpful in predicting the occurrence, orientation and/or density of fractures that may have formed as a result of rock failure. As appreciated by those of skill in the art, steps 322, 324 and 326 are provided in FIG. 3 for illustrative purposes only. The inventive methodology may perform all three, some, or none of the specific applications described herein.

Having the benefit of the present disclosure, those of ordinary skill will readily appreciate the utility of the mechanical rock property estimates derived from the disclosed methodologies. In one example, the historical mechanical rock property estimates may be used to refine and improve evolution models of geological structures. Relevant evolution modeling may include, but is not limited to, assessing the stress history of a hydrocarbon reservoir, predicting the presence of faults in a rock formation and/or assisting in the interpretation of poorly-imaged regions within a hydrocarbon trap. In some embodiments, the improved estimates of mechanical rock property information allow workers to better determine where and how to drill a well into a particular rock formation.

EXAMPLES

Figure 4A:
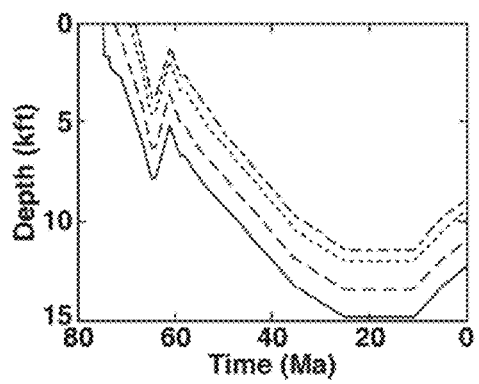
FIGS. 4A-4D depict example outputs from a model showing the evolution of depth (4A), temperature (4B), quartz cement (4C), clay (4D) and total porosity (4E).
Figure 4B:
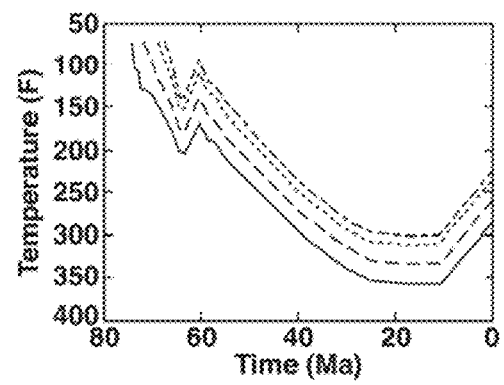

FIGS. 4A-4D depict example outputs from a model showing the evolution of depth (4A), temperature (4B), quartz cement (4C), clay (4D) and total porosity (4E). The depicted data comes from subsurface samples taken from a well in the Piceance Basin in western Colorado. FIGS. 4A and 4B are typical depth and temperature versus time plots that can be constructed with any manner of software using the Lopatin method. The lines in each plot show the burial and temperature history for four different beds. The age of each bed is represented where each line intersects the top horizontal axis in FIG. 4A. The present day depth and temperature for each bed is represented where the lines intersect the right vertical axis. The shape of each curve is constructed from the thickness and age of the overlying strata intersected by the well, plus any overburden which is interpreted to have been deposited and then eroded from that location. The third input is the value of basal heat flow through time.

Figure 4C:
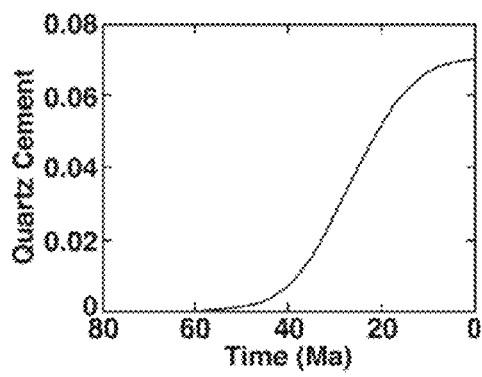
Figure 4D:
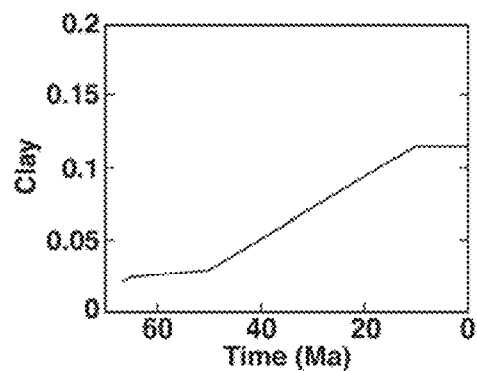

FIGS. 4C and 4D show results of a model simulation indicating the proportion of quartz cement and clay, respectively, which have grown in the pore spaces of an individual sample through time. The values where the lines cross the right vertical axis are the presently-measured values, while the value where the line crosses the horizontal axis is the assumed starting value at the time of deposition. The shape of the curve is determined primarily from the temperature history for that particular bed as taken from FIG. 4B.

Figure 4E:
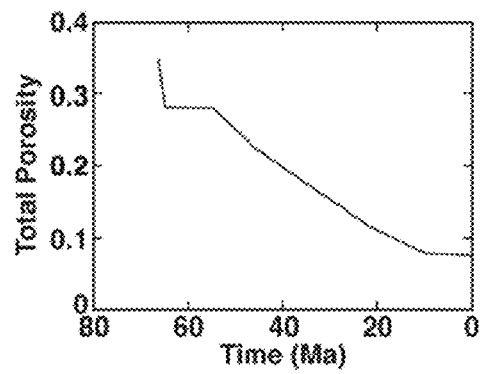

FIG. 4E shows a prediction of the evolution of porosity through time for a particular bed. This plot combines the effects of burial-related compaction and all the cementing agents observed in the pore spaces. The value where the line crosses the right vertical axis is measured in thin section, and the point where the line begins in the upper left corner is the assumed value at the time of deposition.

Figure 5A:
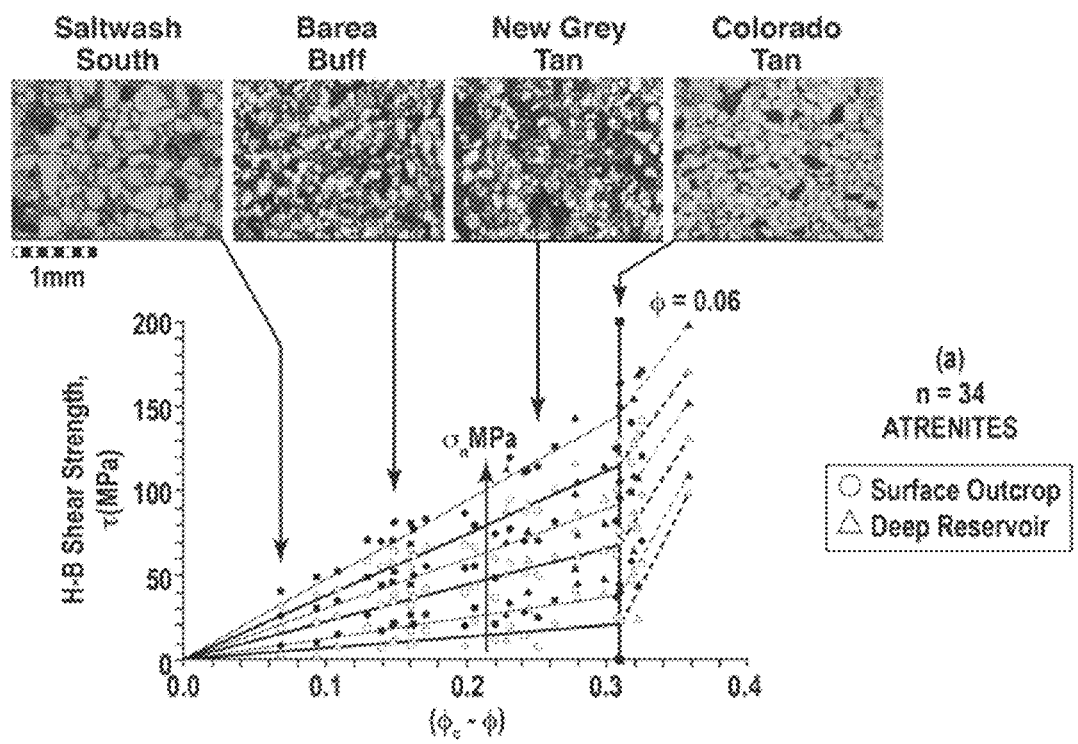
FIGS. 5A-5C depict empirical correlations of shear strength vs. porosity difference for Arenites (5A), Wackes (5B) and Shales (5C).
Figure 5B:
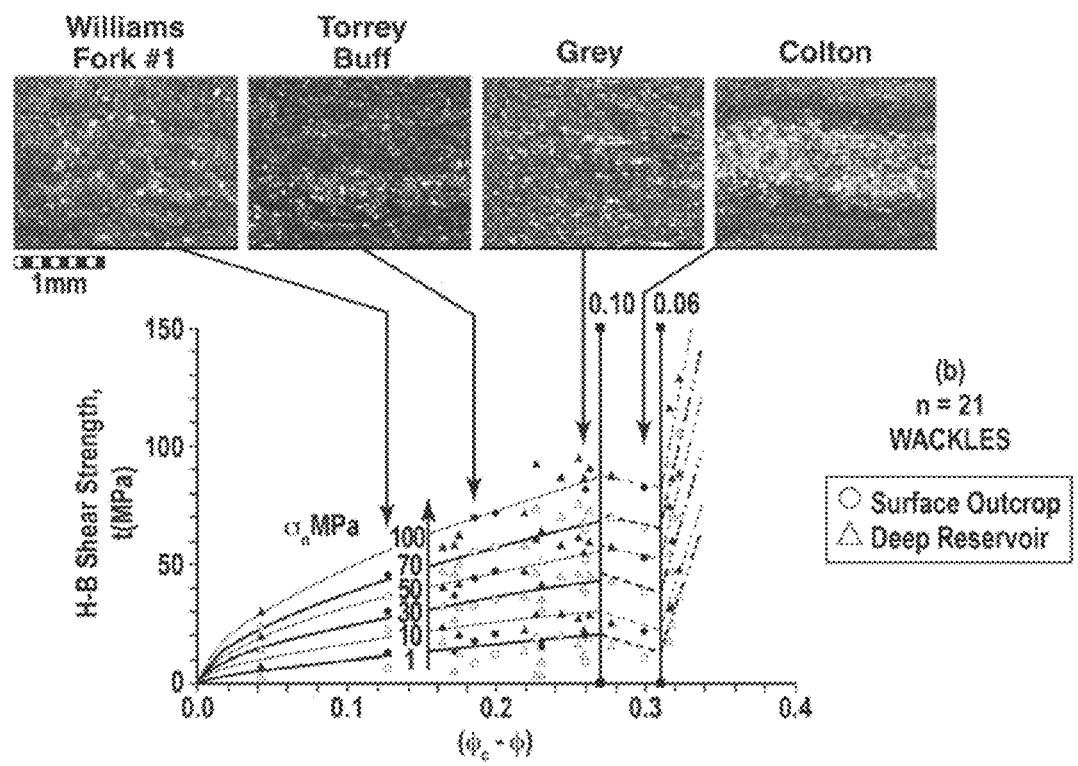
Figure 5C:
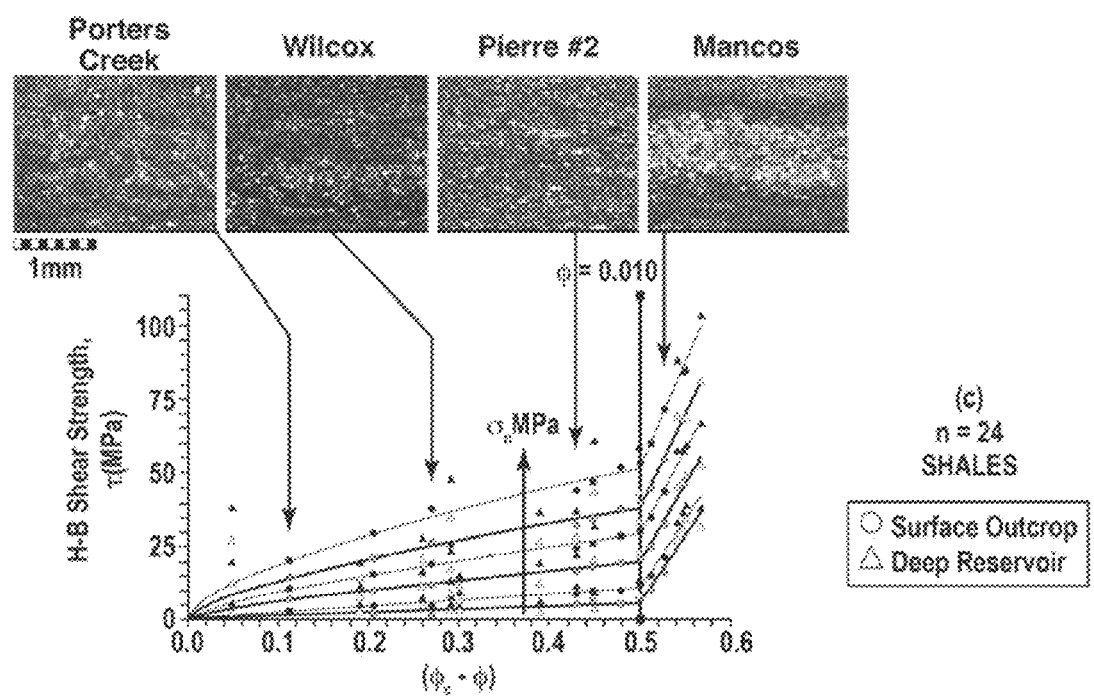

FIGS. 5A-5C depict empirical correlations of shear strength vs. porosity difference for Arenites (5A), Wackles (5B) and Shales (5C). These siliciclastic rocks are defined as follows with increasing fine-grained matrix component: clean sandstones (arenites)≤15% $V_{matrix}$, 15% $V_{matrix}$<shaly sandstones (wackes)<37% $V_{matrix}$, shales≥37% $V_{matrix}$, where "$V_{matrix}$" represents the fine-grained matrix volume fraction as determined from thin-section point counting. As is known by those of ordinary skill, arenites are grain-framework supported with clay being dispersed within the pore space of load-bearing sand grains, shales are clay-matrix supported with sand grains dispersed within fine-grained matrix material and wackes represent a transitional microstructure between arenites and shales.

The empirical correlations depicted in FIGS. 5A-5C are based upon the "critical porosity" concept proposed by Nur et al. (1998), which is used to establish a hypothetical "zero strength condition" for the siliciclastic database rocks. Nur suggested that the critical porosity "$\phi_C$" separates load-bearing sediments at lower porosities ($\phi<\phi_C$) from suspensions at higher porosities ($\phi<\phi_C$), where "$\phi$" equals the present-day porosity. Equating zero strength with critical porosity, one might expect $\phi_C$~37% for sandstones (equivalent to unconsolidated sand grains) and $\phi_C$~60% for shales (equivalent to flocculated clays). If "$\phi$" is the porosity as measured on the database rocks (at ambient pressure/temperature conditions), then mechanical strength should increase systematically as ($\phi_C-\phi$) increases. Finally, mechanical rock strength is defined as the peak shear strength "$\tau$" prior to brittle shear fracture for a given value of normal stress "$\sigma_n$", such that shear strength and normal stress are related by a function characteristic of the rock type.

From the empirical correlations depicted in FIGS. 5A-C, it is apparent that shear strength "$\tau$" increases systematically with increasing porosity difference ($\phi_C-\phi$) for constant values of normal stress "$\sigma_n$". However, specific "$\tau$" versus ($\phi_C-\phi$) versus "$\sigma_n$" relationships are markedly different from arenite to wacke to shale. As the critical porosity fraction is fixed ($\phi_C$=0.37 for sandstones and $\phi_C$=0.60 for shales), it is evident that ambient porosity fraction "$\phi$" has first order control on rock strength for a given value of normal stress, despite the fact that other petrographic parameters such as mineralogy, grain-size and cementation are also varying within each petrophysical subclass. Sandstones (both arenites and wackes) both exhibit a transition in the rate of change of shear strength with porosity difference at an ambient porosity fraction, $\phi$=0.06, while shales exhibit a similar transition but at an ambient porosity fraction, $\phi$=0.10.

The relationships depicted on these graphs demonstrate how the strength of a rock increases systematically with decreasing porosity. In embodiments of the present disclosure, this relationship is combined with a system to predict porosity evolution through time to derive rock strength as a function of time. In general this is straightforward, except in cases where there is considerable creation of clay in the pore space of a rock. In these cases, rock strength can actually decrease through time owing to crossing the mineralogical thresholds between arenite and wacke, or wacke and shale.

Figure 6A:
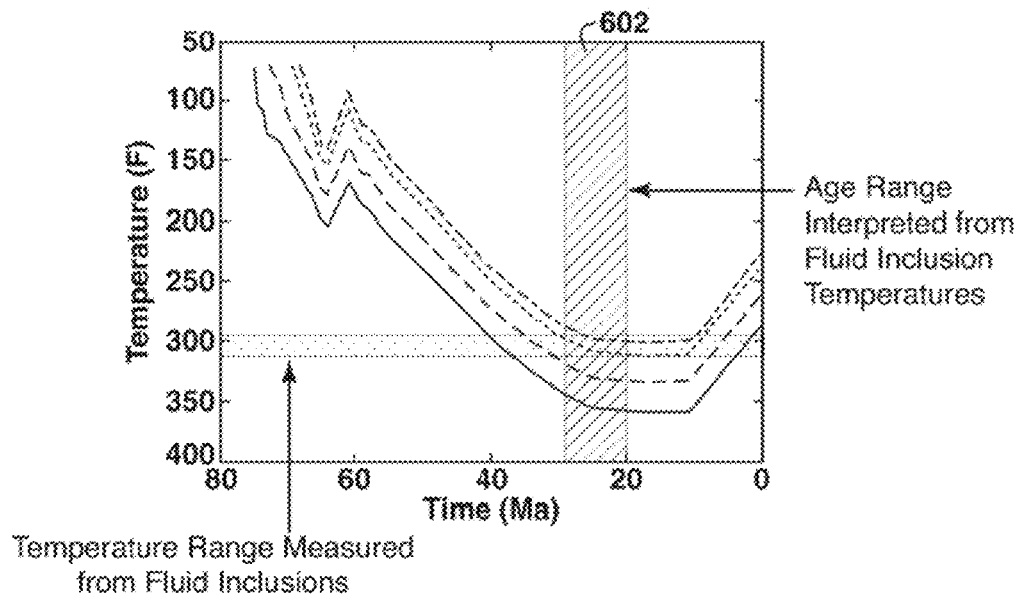
FIGS. 6A-6C depict plot estimated depth (6A) and rock properties, internal angle of friction (6B) and cohesion (6C), through time.
Figure 6B:
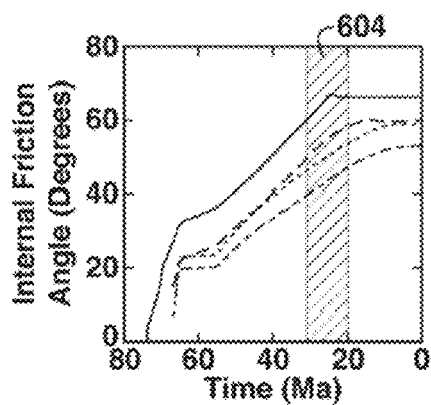
Figure 6C:
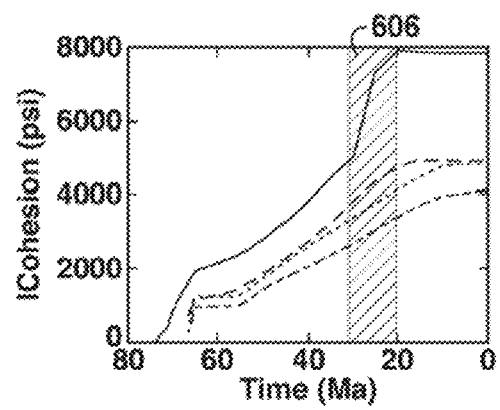

FIGS. 6A-6C depict estimated temperature (6A) and two mechanical rock properties, internal angle of friction (6B) and cohesion (6C), through time. The gray areas 602, 604, 606 represent the likely time of fracture formation based upon measurements of the homogenization temperature of aqueous fluid inclusions within the mineral cements filling the fracture. The homogenization temperatures determined this way are then compared to the time-temperature as shown in FIG. 4B. The range of measured temperatures and/or the uncertainty of the temperature measurements determine the position and size of the gray boxes provided in FIGS. 6A-6C. FIG. 6A is the same as FIG. 4B with the addition of this temperature band. Since the minerals in which these aqueous homogenization temperatures are measured occur within a fracture, they provide an estimate of the temperature at which the fracture was open in the subsurface. Once this band is plotted on FIG. 6A, then the timing can be determined and transferred to FIGS. 6B and 6C.

FIGS. 6B and 6C represent the resulting strength-through-time plots derived from embodiments of the methodology. FIG. 6B specifically demonstrates the estimated Mohr-Coulomb internal friction angle estimated through time for the four beds illustrated in FIGS. 6A and 4A. FIG. 6C demonstrates the estimated Mohr-Coulomb cohesion through time for the same four beds.

Figure 7A:
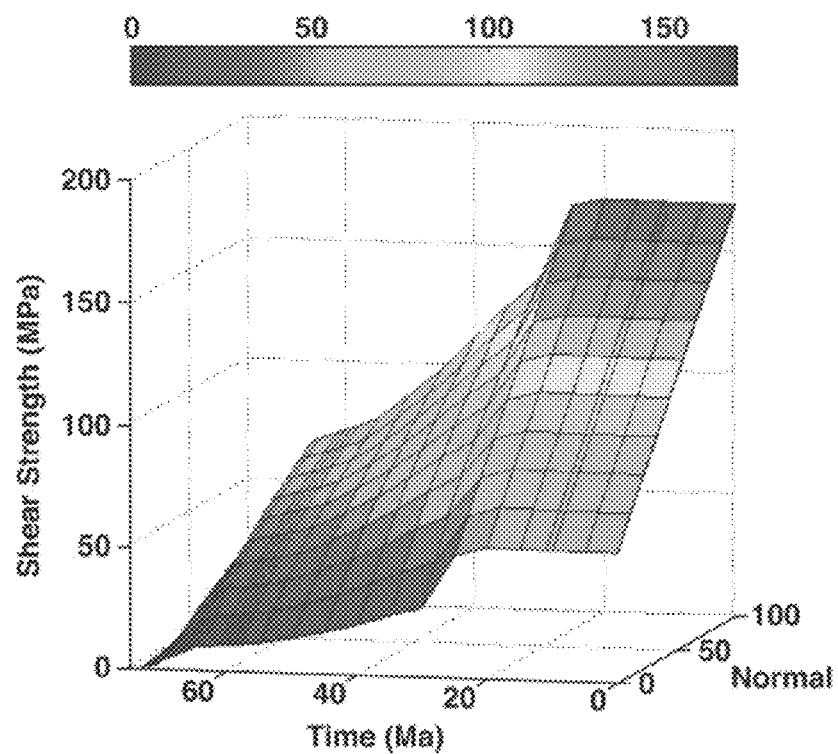
FIGS. 7A and 7B are three-dimensional plots of the calculated shear strength vs. Normal stress relationship for two adjacent rock samples.
Figure 7B:
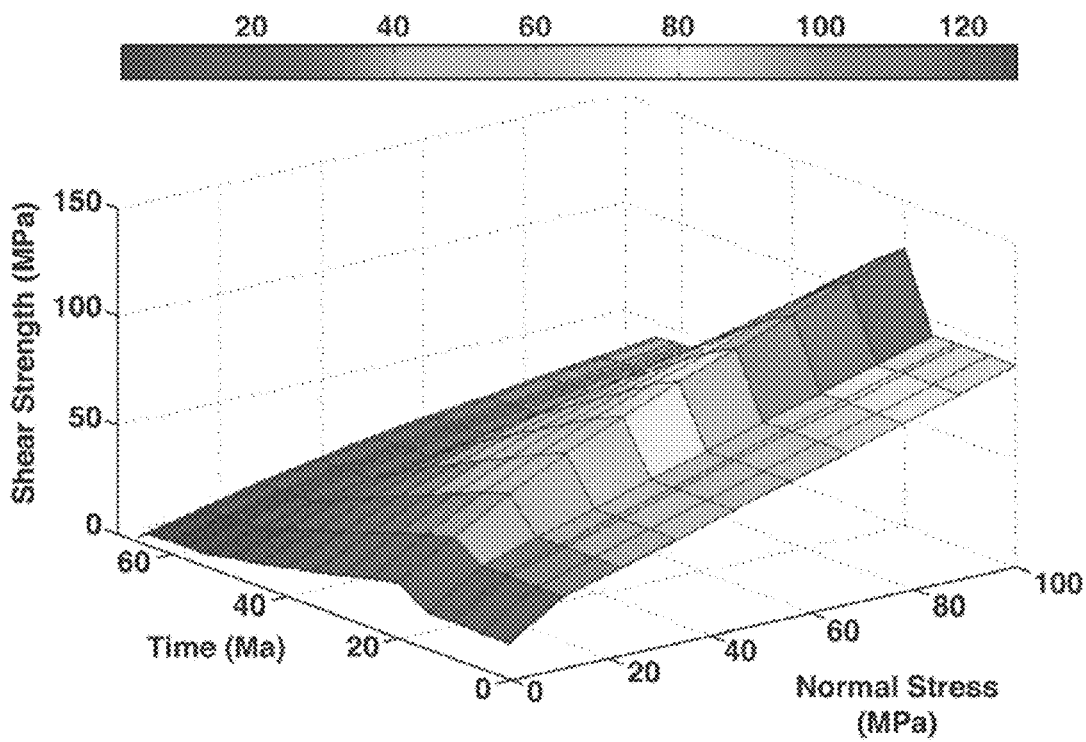

FIGS. 7A and 7B are three dimensional plots of the calculated shear strength vs. normal stress relationship for two adjacent rock samples, from the time they were deposited to the present day. FIG. 7A shows both the slope of the shear stress relationship 702 and the intercept of this line with the shear stress axis 704. Both of these values increase as the rock evolves from deposition to the present day. The increase in slope of the shear stress vs. normal stress line 702 is equivalent to an increase in the angle of internal friction. The increase in the intercept of the shear stress axis 704 is equivalent to an increase in cohesion. The increase in both of these parameters in this sample indicates that the rock continually strengthened through time, although in a non-linear fashion.

FIG. 7B demonstrates that rock mechanical evolution need not be a process of continual increase in strength. In this example, the rock undergoes a significant decrease in both cohesion and angle of internal friction at about 20 million years before present. This results from an increase in clay content due to diagenetic alteration of feldspar and rock fragments, which changes the rock composition from an arenite to a wacke. The decrease in strength coincides with our estimates of the timing of fracturing of this bed (gray box 602 from FIG. 6A), and we ascribe this as the causal mechanism for failure, even though there are no expected changes in regional stress patterns at this time and while the adjacent, stronger bed could remain unfractured.

An advantage of the disclosed techniques is that they provide an estimate of the earth's stress conditions, at the horizon of interest, at the time of interest. This is important, for example, when trying to model the mechanical evolution of a geological structure. It is also important in attempting to predict the occurrence, and thus the orientations and density, of fractures that may have formed as a result of rock failure.

Unless otherwise indicated, in "provide"-type operations described below, the data or other subject matter being provided may be acquired from a pre-existing store, or it may be created, measured, derived, etc., specifically for the purpose.

Those of ordinary skill having the benefit of this disclosure will appreciate that some of the operations described below need not necessarily be conducted in the precise sequence described. It is important to note that the steps depicted in FIGS. 2 and 3 are provided for illustrative purposes only and a particular step may not be required to perform the inventive methodology. The claims, and only the claims, define the inventive system and methodology.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

REFERENCES

Nur et al., "Critical porosity: a key to relating physical properties to porosity in rocks," *The Leading Edge* 17, 357-362 (1998).

What is claimed is:

1. A method of estimating a mechanical property value of a rock formation comprising:
   generating a correlation model, where the correlation model correlates at least one mechanical property with a porosity value and a composition value relative to a first rock type;
   generating an evolution model, where the evolution model utilizes thermal-history data and burial-history data for the rock formation;
   using the evolution model to generate an estimation of a past porosity value and a past composition value for the rock formation at a point of time in the geologic past; and
   identifying in the correlation model a mechanical property value at the point of time in the past based on the estimated past porosity and past composition values.

2. The method of claim 1 further comprising:
   acquiring present day data of the rock formation; and
   processing the present day data to generate the correlation model.

3. The method of claim 2, wherein the present day data comprises porosity data, composition data and mechanical property data.

4. The method of claim 2, wherein the present day data is acquired using at least one of the techniques selected from the group consisting of thin-section point counting, x-ray diffraction and helium porosimetry.

5. The method of claim 1 further comprising predicting presence of faults in the rock formation based on the mechanical property value.

6. The method of claim 1 further comprising estimating a stress history of the rock formation based on the mechanical property value.

7. The method of claim 1 further comprising predicting strength of the rock formation based on the mechanical property value.

8. A computer-implemented method of estimating mechanical property values of a rock formation comprising:
   generating a first correlation model for a first rock type, where the first correlation model correlates at least one mechanical property with a porosity value or composition value of the first rock type;
generating a second correlation model for a second rock type, where the second correlation model correlates at least one mechanical property with a porosity value or composition value of the second rock type;
generating an evolution model of the rock formation, where the evolution model utilizes thermal-history data and burial-history data for the rock formation;
determining a first porosity value and a first composition value at a first point of time in a geologic timescale using the evolution model;
determining a second porosity value and a second composition value at a second point of time in a geologic timescale using the evolution model;
using a computer to identify in the first correlation model a first mechanical property value at the first point of time based on the first porosity and first composition values; and
using a computer to identify in the second correlation model a second mechanical property value at the second point of time based on the second porosity and second composition values.

9. The method of claim 8 further comprising predicting presence of faults in the rock formation based on the first and second mechanical property values.

10. The method of claim 8 further comprising estimating a stress history of the rock formation based on the first and second mechanical property values.

11. The method of claim 8 further comprising predicting strength of the rock formation based on the first and second mechanical property values.

* * * * *